(No Model.) 2 Sheets—Sheet 1.
M. EGAN & C. G. UDELL.
FEED WATER PURIFIER.
No. 464,474. Patented Dec. 1, 1891.
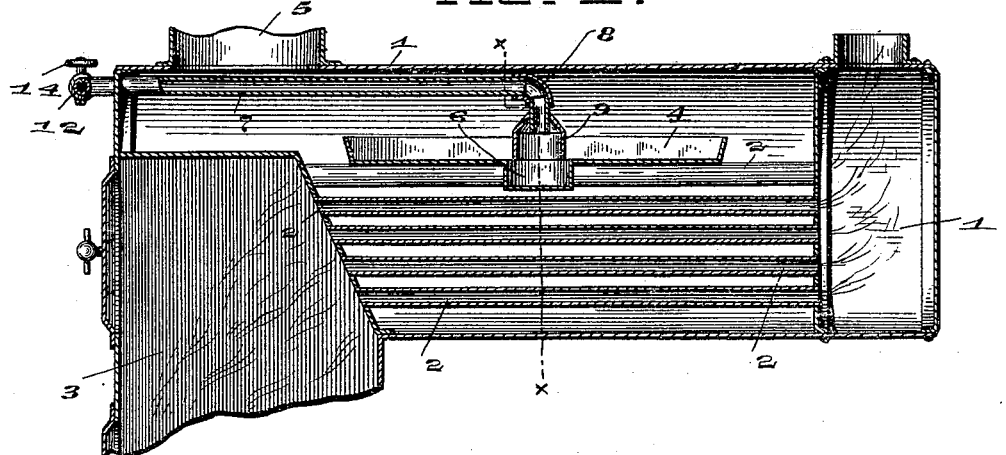
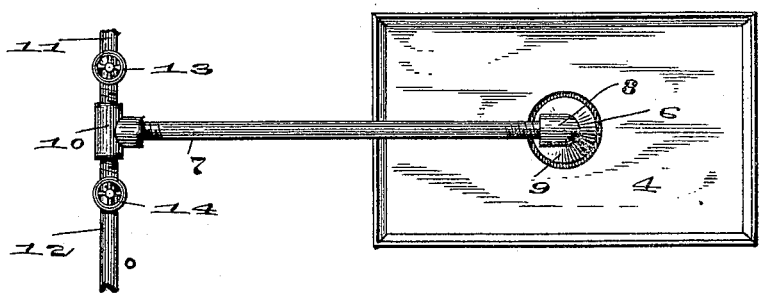
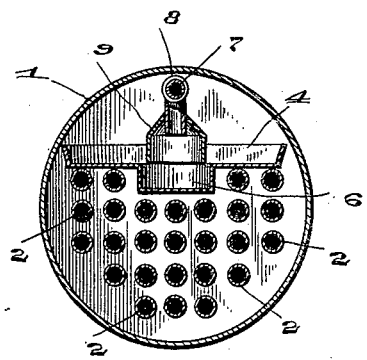
Witnesses
H. D. Nealy
E. B. Griffith
Inventors
Michael Egan,
Calvin G. Udell,
By their Attorney
C. P. Jacobs.

(No Model.) 2 Sheets—Sheet 2.
M. EGAN & C. G. UDELL.
FEED WATER PURIFIER.
No. 464,474. Patented Dec. 1, 1891.
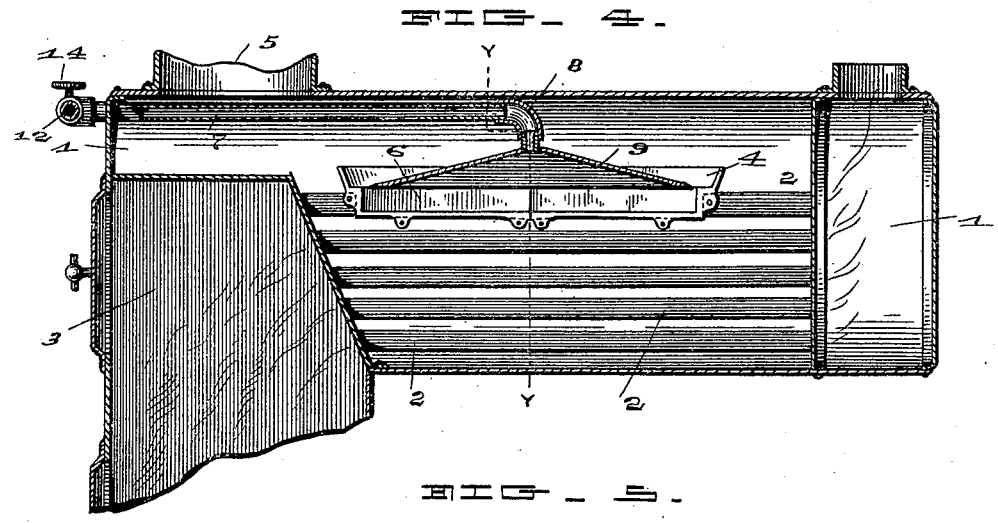
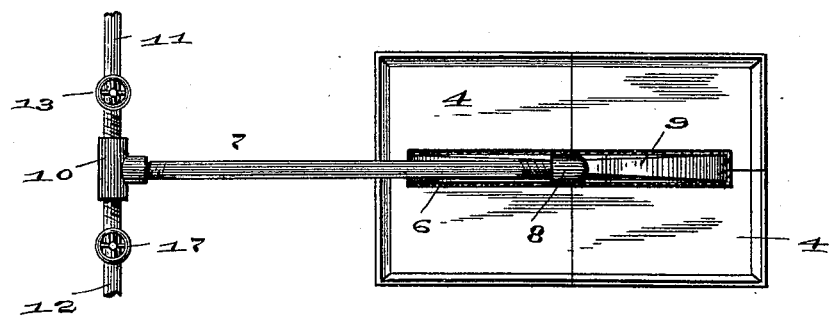
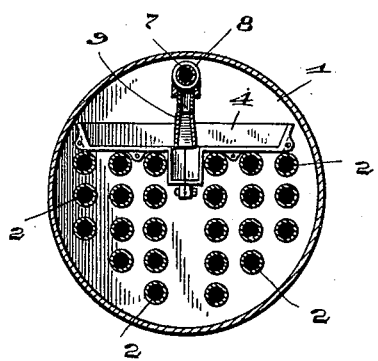
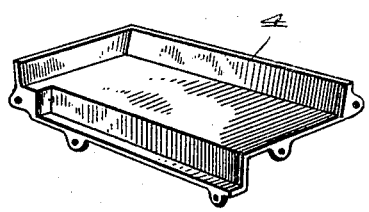

UNITED STATES PATENT OFFICE.

MICHAEL EGAN AND CALVIN G. UDELL, OF NORTH INDIANAPOLIS, INDIANA.

FEED-WATER PURIFIER.

SPECIFICATION forming part of Letters Patent No. 464,474, dated December 1, 1891.

Application filed December 1, 1890. Serial No. 373,242. (No model.)

*To all whom it may concern:*

Be it known that we, MICHAEL EGAN and CALVIN G. UDELL, both of North Indianapolis, county of Marion, State of Indiana, have invented certain new and useful Improvements in Feed-Water Purifiers; and we do hereby declare that the following is a full, clear, and exact description thereof, reference being had to the accompanying drawings, in which like figures refer to like parts.

Our invention relates to the construction and arrangement of feed-water purifiers, and will be understood from the following description.

In the drawings, Figure 1 is a vertical longitudinal section of a boiler with our device in place, a part of the fire-box being broken away. Fig. 2 is a top view of the device removed from the boiler. Fig. 3 is a section on the line *x x*, Fig. 1. Fig. 4 is a vertical longitudinal section of a boiler, showing a slightly modified form of our device. Fig. 5 is a top view of the modified form of the device removed. Fig. 6 is a sectional view on the line *y y*, Fig. 4. Fig. 7 is a perspective view of one of the sections of the modified form of the pan.

In detail, 1 is a boiler, having flues 2 and fire-box 3.

4 is a shallow pan, which may be made in any convenient shape for inserting in the man-hole of the boiler; or the device may be put in place before the boiler is closed, as shown in the drawings. This pan rests upon flues on each side and has a well 6, which drops between the flues, as shown in Fig. 3.

7 is a pipe which passes through the boiler-head and terminates in an elbow 8, with which is connected a bell-shaped funnel which enters the pan in line with the well, and is of such size as to leave an annular opening about its periphery and between it and the sides of the well 6, this opening preferably having an area substantially that of the pipe 7. At the outer end of this pipe is a T 10, connected with which are pipes 11 and 12, one provided with a valve 13 and the other with a similar valve 14. These valves, however, are used for different purposes, one controlling the inlet of water and the other being used for blowing off. The pan is set so as to rest upon the upper flues, and the line of the water in the boiler is normally about level with or a little above the top of the pan, so that as the water is fed in through the pipes 11 and 7 it will pass down through the funnel 9 into the well of the pan, and the overflow from the pan will feed the boiler, most of the sediment settling in the well 6, though some of it will of course be deposited upon the bottom of the pan itself.

When it is desired to blow off the boiler, the inlet-cock 13 is preferably closed and the blow-off cock 14 is opened, and the steam will then press on the water in the pan and on the surface of the water in the boiler, forcing it up through the funnel 9, carrying with it the sediment that has been deposited in the pan and well and any scum or other impurities that may float on the surface out the pipes 7 and 12; but the device will operate even though the valve 13 is not closed, as the steam-pressure will force back the water coming in through the pipe 11, and will yet carry off the scum and sediment through the pipe 12. The water being heated in the pan parts with its sediment and very little of it goes into the boiler below, but if it does the usual lower blow-off is sufficient to loosen it and carry it away without interfering with our device located above.

In Figs. 4 to 7 we show a modified form of our device, in which the well 6 in the pan 4 is formed in a rectangular shape and the funnel is made to correspond in shape, its outer edge being slightly smaller than the well, as shown. This form of our device is intended to be put in boilers without removing any of the flues. In the modified form it will also be seen that the pan 4 is made in sections, one of them being shown in Fig. 7, so that it may be put in boilers already finished, the sections being put in separately and then bolted together. The principle, however, in this modification remains the same, and these changes will not affect its practical operation.

The several forms of device shown in the drawings are all operated on the same principle, and doubtless the arrangement of the parts might be still further modified without departing from the principle of our invention.

What we claim as our invention, and desire to secure by Letters Patent, is the following:

1. In a feed-water purifier, a pan supported on the flues inside the boiler and having a well below for receiving the matter deposited from the heated water, a hood supported above such well and of less area than the same, its lower edges on a line with the bottom of the pan and connected above to a pipe leading outside the boiler and terminating in branch pipes having inlet and outlet valves therein, substantially as shown and described.

2. In a feed-water purifier, a pan made in sections adapted to be united, such pan having a well below for receiving the deposits from the heated water, and a funnel-shaped hood supported above such well and of less area than the same, in combination with a pipe connected to such funnel and extended through and outside the boiler, terminating in branch pipes provided with inlet and blow-off valves, substantially as shown and described.

In witness whereof we have hereunto set our hands this 22d day of November, 1890.

MICHAEL EGAN.
CALVIN G. UDELL.

Witnesses:
E. B. GRIFFITH,
C. P. JACOBS.